(12) United States Patent
Yen et al.

(10) Patent No.: US 7,127,158 B1
(45) Date of Patent: Oct. 24, 2006

(54) WATER SPRAYER AND HEATER ASSEMBLY FOR WINDSHIELD WIPER

(76) Inventors: Jen-Yen Yen, No. 22-1, Lane 3, Haochin Rd., Nanhsin Tsun, Yenpu Hsiang, Changhua County (TW); Hung-Ta Huang, 9/F., No. 520, Pate Rd., Sec. 4, Sungshan Dist., Taipei City (TW)

( * ) Notice: Subject to any disclaimer, the term of this patent is extended or adjusted under 35 U.S.C. 154(b) by 0 days.

(21) Appl. No.: 11/178,355

(22) Filed: Jul. 12, 2005

(51) Int. Cl.
*F24H 1/10* (2006.01)
(52) U.S. Cl. ............................ 392/485; 392/465
(58) Field of Classification Search ............. None
See application file for complete search history.

(56) References Cited

U.S. PATENT DOCUMENTS

| | | | | |
|---|---|---|---|---|
| 3,888,412 A | * | 6/1975 | Lindo | 237/12.3 B |
| 4,090,668 A | * | 5/1978 | Kochenour | 239/130 |
| 4,508,957 A | * | 4/1985 | Rocchitelli | 392/479 |
| 5,118,040 A | * | 6/1992 | Abe | 239/284.1 |
| 5,509,606 A | * | 4/1996 | Breithaupt et al. | 239/130 |
| 6,029,908 A | * | 2/2000 | Petzold | 239/284.1 |
| 6,131,237 A | * | 10/2000 | Kasper et al. | 15/320 |
| 6,164,564 A | * | 12/2000 | Franco et al. | 239/284.1 |
| 6,892,417 B1 | * | 5/2005 | Franco et al. | 15/250.02 |
| 6,898,820 B1 | * | 5/2005 | Kasper et al. | 15/320 |
| 2002/0137455 A1 | * | 9/2002 | Ivanov et al. | 454/157 |
| 2004/0170411 A1 | * | 9/2004 | Kuebler et al. | 392/484 |
| 2005/0001058 A1 | * | 1/2005 | Shank et al. | 239/284.1 |

* cited by examiner

*Primary Examiner*—Thor S. Campbell
(74) *Attorney, Agent, or Firm*—Rosenberg, Klein & Lee

(57) ABSTRACT

A water sprayer and heater assembly for windshield wiper is disclosed to include a controller; a water container connected between a water supply pipe and a water spray tube at the windshield wiper, a water pressure switch electrically connected to the controller and set in communication between the water supply pipe and the water inlet of the water container, and an electric heater mounted in the water container and electrically connected to the controller and controllable by the controller to heat water in the water container when a flow of water passes from the water supply pipe through the water pressure switch into the water container.

3 Claims, 3 Drawing Sheets

WATER SPRAYER AND HEATER ASSEMBLY FOR WINDSHIELD WIPER

BACKGROUND OF THE INVENTION

1. Field of the Invention

The present invention relates to a water sprayer for windshield wiper and more particularly, to a water sprayer and heater assembly for windshield wiper.

2. Description of the Related Art

When driving a car during a snowing day, the windshield wipers may have to be operated to remove snow from the windshield glass. When operating the windshield wipers, a water sprayer is controlled to spray cold water out of the windshield wipers over the windshield glass for quick removal of accumulated snow. However, sprayed cold water may be soon frozen on the surface of the windshield glass, hindering the operation of the windshield wipers.

SUMMARY OF THE INVENTION

The present invention has been accomplished under the circumstances in view. It is therefore one object of the present invention to provide a water sprayer and heater assembly for windshield wiper, which sprays hot water over the windshield glass for quick removal of snow from the windshield glass during operation of the windshield wiper. To achieve this and other objects of the present invention, the water sprayer and heater assembly comprises a controller; a water container, the water container having a water inlet and a water outlet, the water outlet being connected to a water spray tube at a windshield wiper; a water pressure switch electrically connected to the controller, the water pressure switch having a water input side connected to a water supply pipe for receiving water from the water supply pipe and a water output side connected to the water inlet of the water container; and an electric heater mounted in the water container and electrically connected to the controller and controllable by the controller to heat water in the water container when a flow of water passes from the water supply pipe through the water pressure switch into the water container. In one embodiment of the present invention, the water container is made having s a first water chamber disposed at the top side, a second water chamber disposed at the bottom side, and a water hole in fluid communication between the first water chamber and the second water chamber. In an alternate form of the present invention, partition plates are respectively mounted in the two water chambers, defining a respective detoured water passageway in each water chamber.

DESCRIPTION OF THE RELATED ART

DETAILED DESCRIPTION OF THE PREFERRED EMBODIMENT

Figure 1:
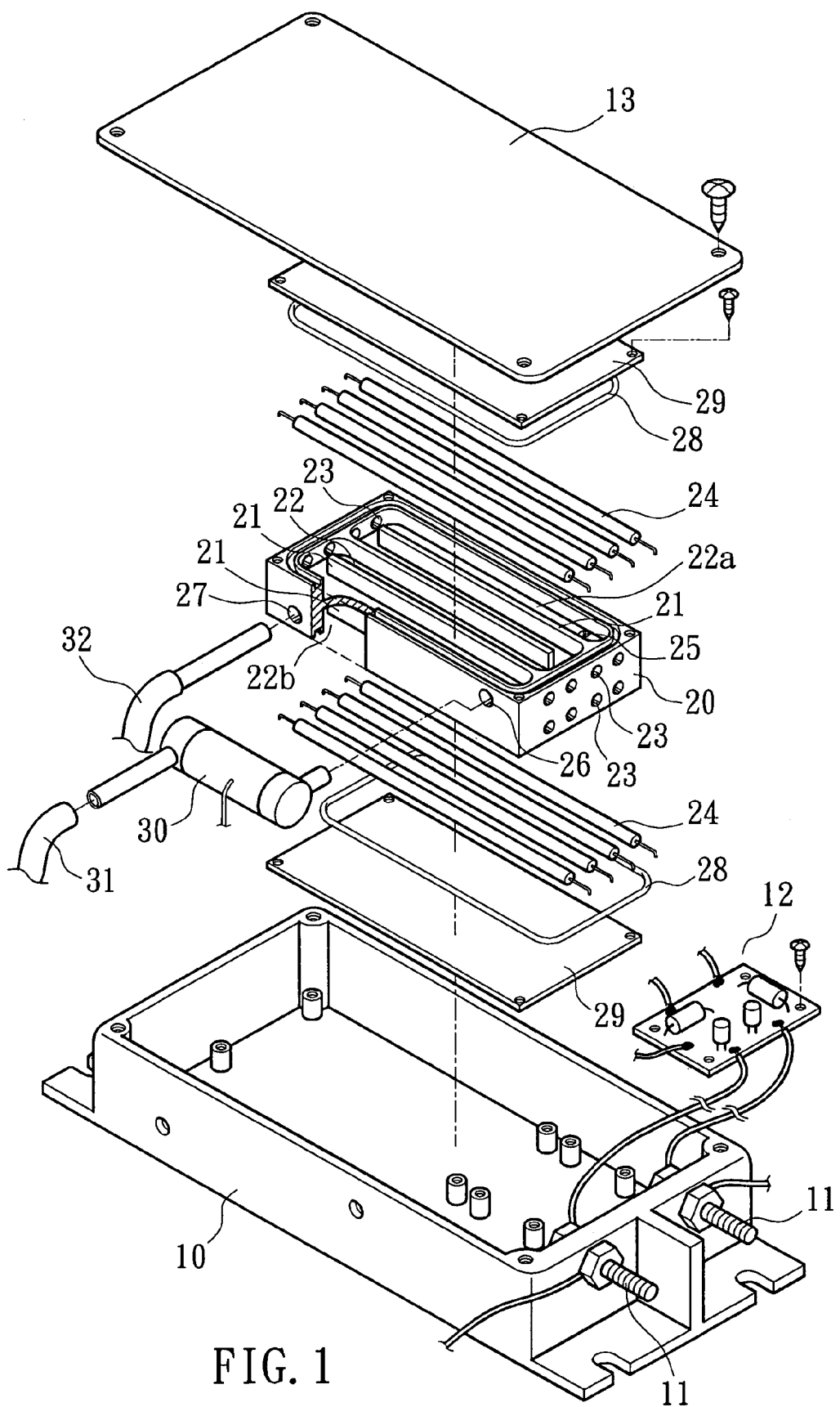
FIG. 1 is an exploded view of a water sprayer and heater assembly for windshield wiper according to the present invention.
Figure 2:
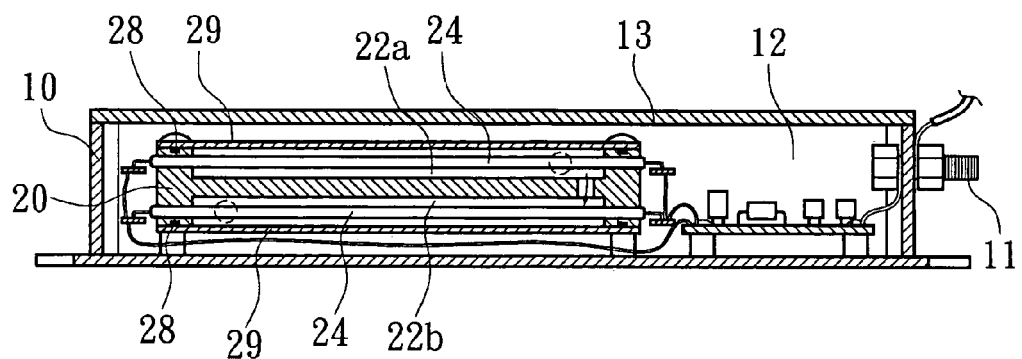
FIG. 2 is a sectional front view of the water sprayer and heater assembly for windshield wiper according to the present invention.
Figure 3:
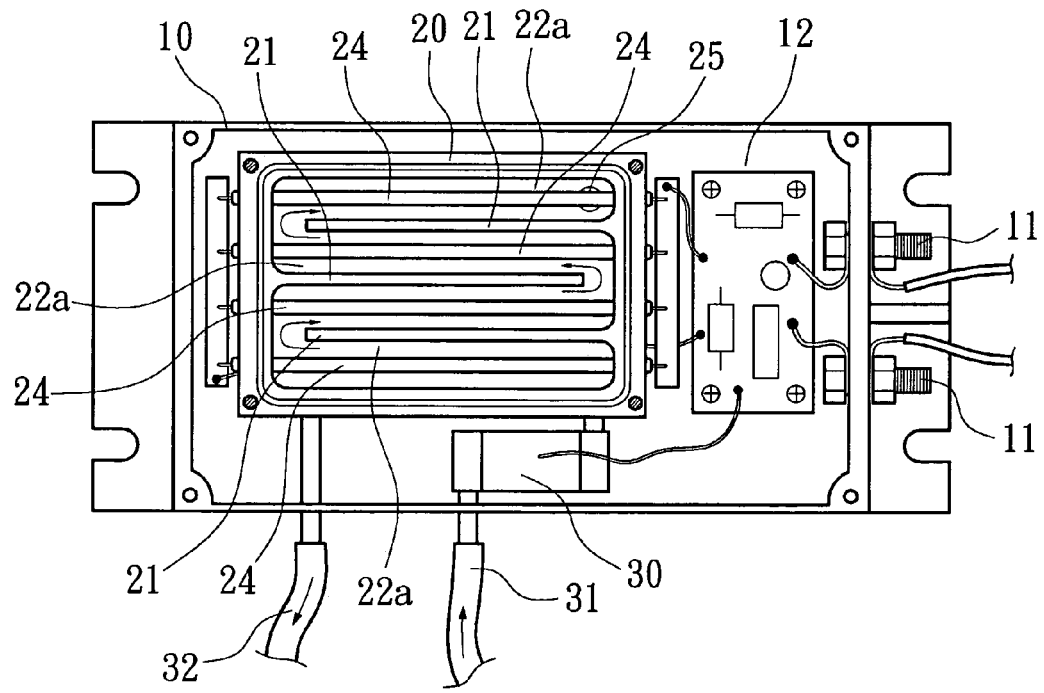
FIG. 3 is a sectional top view of the water sprayer and heater assembly for windshield wiper according to the present invention.

Referring to FIGS. 1~3, a water sprayer and heater assembly in accordance with the present invention is shown comprising a housing 10, a controller 12 mounted inside the housing 10, a water pressure switch 30, a water container 20 mounted inside the housing 10, an electric heater 24 mounted inside the water container 20, and a cover plate 13, which covers the housing 10. The water pressure switch 30 has a water input side connected to a water supply pipe 31 to receive water from a water tank in the motor vehicle (not shown), and a water output side connected to a water inlet 26 of the water container 20. The electric control line of the water pressure switch 30 is electrically connected to the controller 12. The water container 20 has a water outlet 27 connected to a spay tube 32 at the windshield wiper (not shown). The electric heater 24 is electrically connected to the controller 12, and controlled to heat water in the water container 20 to a predetermined temperature level, enabling hot water to be sprayed out of the spray tube 32.

Referring to FIGS. 1~3 again, the water container 20 has partition plates 21 mounted therein, defining the holding space of the water container 20 into two detoured water passageways 22a and 22b at two opposite sides, and a water hole 25 in fluid communication between the two detoured water passageways 22a and 22b. Mounting holes 23 are formed in two opposite upright sidewalls of the water container 20. The electric heater 24 is fastened to the mounting holes 23 and suspending in the detoured water passageways 22a and 22b. Two cover plates 29 are respectively packed with gasket members 28 and fastened to the top and bottom sides of the water container 20 to keep the detoured water passageways 22a and 22b in a watertight status. When water passes from the water supply pipe 31 into the water inlet 26, it flows through one water passageway 22a to the other water passageway 22b via the water hole 25, and then flows out of the water container 20 into the spray tube 32 through the water outlet 27. When water is passing through the water passageways 22a and 22b, the water heater 24 is operated to heat water.

Figure 4:
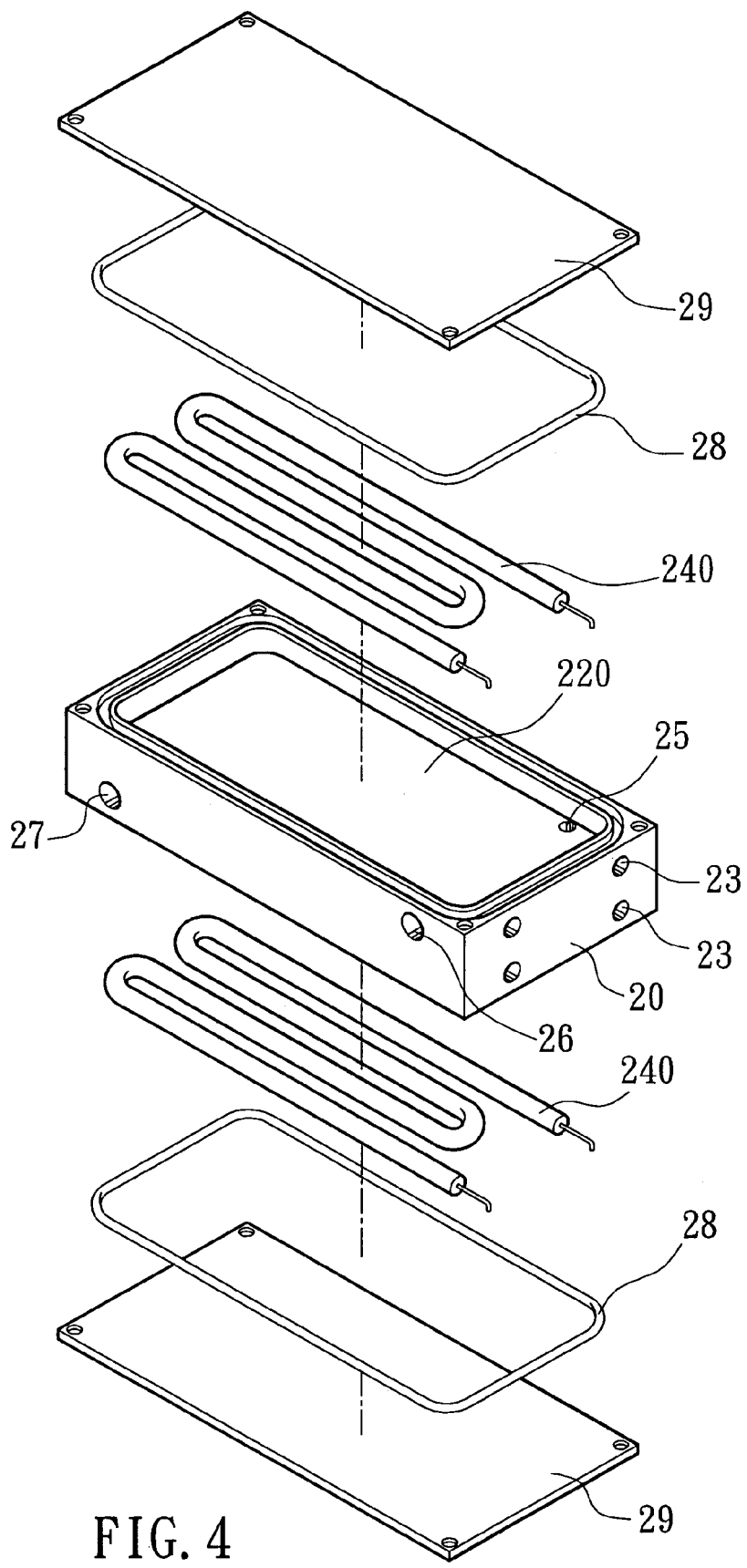
FIG. 4 is an exploded view of an alternate form of the present invention.

FIG. 4 shows an alternate form of the present invention. According to this embodiment, the water container 20 has two water chambers 220 respectively arranged at the top and bottom sides, a water hole 25 in fluid communication with the two water chambers 220, two cover plates 29 respectively packed with a respective gasket member 28 and fastened to the top and bottom sides of the water container 20 to keep the two water chambers 220 in a watertight status. The water heater 240 is fastened to mounting holes 23 at the water container 20 and suspending in the water chambers 220.

Referring to FIG. 3 again, if the driver switches on the water sprayer switch of the car when driving the car, water passes through the water supply pipe 31 into the water pressure switch 30 to switch on the water pressure switch 30, allowing passing of water into the detoured water passageways 22a and 22b. At the same time, the electric heater 24 is turned on to heat water flowing through the detoured water passageways 22a and 22b, so that hot water is obtained and delivered out of the water outlet 27 into the spray tube 32 for spraying over the windshield glass of the car. When the driver switched off the water sprayer switch, water is stopped from passing to the water pressure switch 30, therefore the water pressure switch 30 is off, causing the controller 12 to switch off the electric heater 24.

Although particular embodiments of the invention have been described in detail for purposes of illustration, various modifications and enhancements may be made without departing from the spirit and scope of the invention. Accordingly, the invention is not to be limited except as by the appended claims.

The invention claimed is:

1. A water sprayer and heater assembly comprising:
   a controller;
   a water container, said water container having a water inlet and a water outlet, said water outlet being connected to a water spray tube at a windshield wiper, said water container including a first water chamber disposed at a top side thereof, a second water chamber disposed at a bottom side thereof, a water hole in fluid communication between said first water chamber and said second water chamber, two cover plates respectively covered on said first water chamber and said second water chamber, and gasket means peripherally sealed to said cover plates;
   a water pressure switch electrically connected to said controller, said water pressure switch having a water input side connected to a water supply pipe for receiving water from said water supply pipe and a water output side connected to the water inlet of said water container; and
   an electric heater mounted inside said water container and electrically connected to said controller and controllable by said controller to heat water in said water container when a flow of water passes from said water supply pipe through said water pressure switch into said water container, said electric heater being suspended in said first water chamber and said second water chamber of said water container.

2. The water sprayer and heater assembly as claimed in claim 1, further comprising a plurality of partition plates respectively mounted in said first water chamber and said second water chamber and defining each of said first water chamber and said second water chamber a respective detoured water passageway.

3. The water sprayer and heater assembly as claimed in claim 1, further comprising a housing that houses said water container, said controller, said electric heater, and said water pressure switch.

* * * * *